(12) United States Patent
Lin et al.

(10) Patent No.: US 7,114,031 B2
(45) Date of Patent: Sep. 26, 2006

(54) STRUCTURE AND METHOD OF CACHE MEMORY DATA UPDATE

(75) Inventors: Patrick Lin, Hsin Tien (TW); Wei-Pin Chen, Hsin Tien (TW)

(73) Assignee: Via Technologies, Inc., Hsin Tien (TW)

( * ) Notice: Subject to any disclaimer, the term of this patent is extended or adjusted under 35 U.S.C. 154(b) by 348 days.

(21) Appl. No.: 10/423,955

(22) Filed: Apr. 28, 2003

(65) Prior Publication Data

US 2004/0064644 A1  Apr. 1, 2004

(30) Foreign Application Priority Data

Sep. 30, 2002  (TW) .................................. 91122575 A

(51) Int. Cl.
*G06F 12/00*  (2006.01)
*G06F 13/00*  (2006.01)

(52) U.S. Cl. ...................... 711/118; 711/100; 711/154; 711/122

(58) Field of Classification Search ................ 711/118, 711/119, 122, 100
See application file for complete search history.

(56) References Cited

U.S. PATENT DOCUMENTS

| 5,261,066 | A | * | 11/1993 | Jouppi et al. | ................ | 711/122 |
| 5,745,729 | A | * | 4/1998 | Greenley et al. | ........... | 711/131 |
| 5,761,706 | A | * | 6/1998 | Kessler et al. | .............. | 711/118 |
| 6,256,708 | B1 | * | 7/2001 | Watanabe | .................... | 711/122 |
| 6,311,260 | B1 | * | 10/2001 | Stone et al. | ................ | 711/213 |
| 6,314,561 | B1 | * | 11/2001 | Funk et al. | .................. | 717/159 |
| 6,651,143 | B1 | * | 11/2003 | Mounes-Toussi | ........... | 711/138 |

* cited by examiner

*Primary Examiner*—Tuan V. Thai
(74) *Attorney, Agent, or Firm*—Arent Fox PLLC

(57) ABSTRACT

The present invention relates to a structure and a method of data update in a cache memory inside a local processor, which uses the feature of cache control. A buffer block of a header buffer is mapped to a memory space at several different address sectors addressed by the local processor. Whenever the local processor attempts to access the internal cache memory, cache missing will occur so that a local processor will be forced to alternatively request new data from buffer blocks of a header buffer in a HCA. Consequently, the whole block is loaded into cache memory. This does not only boost cache update performance but also accelerates packet access.

10 Claims, 4 Drawing Sheets

STRUCTURE AND METHOD OF CACHE MEMORY DATA UPDATE

BACKGROUND OF THE INVENTION

1. Field of the Invention

This invention relates to the structure and method of data update in the cache memory of a processor, particularly applying in high-speed transmission network. The cache system of a local processor is forced to access data from external sources due to cache missing so that updating the data in the cache memory.

2. Description of the Prior Art

Nowadays high-speed transmission network covers a spectrum of application such as Infiniband, cable modem, optical network, Serial ATA, and so on. For instance, Infiniband transmission technology comprises the second layer (link) and the third layer (network) in the seven-layer OSI (Open System Interconnect Reference Model). It means that the process of frequent internal I/O transmission and the data stream of signal distribution/exchange are thoroughly moved out from the server, and are processed on a node-to-node basis. This not only eliminates the waste of computing resources used in repeating decoding and encoding of packets in the operation of medium-/large-size network servers or clusters, but also reduces delays in system's reaction to external network service to improve the performance.

Infiniband enhances one-to-one or one-to-many I/O management on a node-to-node basis. Some nodes can be defined as subnet because they can be authorized to manage the transmission or configuration of data streams. According to the specification of Infiniband, the transmission speed of Infiniband achieves up to 2.5 Gbps on a single node and 10 Gbps on four nodes. Theoretically the highest transmission speed may reach 30 Gbps when data are transmitted via a maximum of 12 channels at one time.

The theory of signal transmission technology in Infiniband is based on the cross-like line interweaving and switching. It can be applied on media such as copper or fiber. The products applicable by Infiniband are broad such as servers, switches, routers, relevant interface cards, as well as node management software and so on.

Please see FIG. 1, which shows a block diagram of a packet receiving structure used in transmission technology of Infiniband. As shown in FIG. 1, an embodiment comprises a host channel adapter 1 (HCA 1), a hardware module of which supports two or more physical layer ports in order to receive packets from physical layer 2, a host bus interface, two local processor interfaces and a Dynamic Random Access memory 4 (DRAM 4) shared by local processors. The local processors are a receiving processor 5 and a transmitting processor 8. A Synchronous Random Access Memory 3 (SRAM 3) serves as a packet buffer to store the packets transmitted and received between Host Lines Interface and network. There are a plurality of Direct Memory Access (DMA) engines in the hardware module of the HCA 1. Data are transmitted between the SRAM 3 and the host memory as commanded by the local processor. Each port is responding to two hardware engines, one of which is used for transmitting and the other for receiving. For example, the function of the HCA 1 is to connect the host CPU and the Infiniband network.

Again in FIG. 1, when packets are transmitted continuously from physical layer 2 to host memory via the HCA 1, the whole packets are sent to the SRAM 3 and temporarily saved therein. Meanwhile, the packet headers of the packets are copied and temporarily saved to a head buffer 6 so that a receiving processor 5 can access the packet headers for quickly processing instead of carrying them between the shared DRAM 4 and the host SRAM 3 for several times. This method lessens the accessing load of the SRAM 3 as well as that of DRAM 4.

According to prior art, the receiving processor 5 must send a command cycle to the DRAM 4. Only one bit is saved at one time until packet access is completed, which is also called non-cache memory access. Even though this reduces time of carrying the packets between the host memory and the DRAM 4, the processing time still needs to be improved. The processing speed of overall operation is influenced due to slowly processing pockets on the receiving processor 5. However, Some embedded receiving processors 5, use internal cache memory to access incoming packet header in the header buffer 6. In that case, invalidation is caused because of the failure in detecting external updated data. The new incoming packet header updates the data in the header buffer 6, but the updated data is not loaded into the internal cache memory or is not in the cache memory. As the receiving processor 5 will recognize as a "cache hit" due to the address of pocket headers saved in the receiving processor 5 is still the same, the receiving processor 5 will read the old data. Thus, the receiving processor 5 is unable to access the updated packet headers.

Thus, the present invention aims to provide a structure of cache memory for updating the data inside the local processor through using the feature of cache control. The buffer blocks of the external buffer is compulsively mapped to the memory space at different address sectors, and cache missing will occur when local processor accessing the cache memory according to these different addresses. As a result, cache missing will take place whenever the local processor attempts to access data in the buffer block so that the local processor will request data from the external buffer blocks. Therefore, the present invention does not only boost cache-updating performance but also avoid said problems caused by cache unity.

The other purpose of the present invention is to provide a method of data update in the cache system of an embedded processor. Through using the effect of cache missing which causes by compulsively mapping buffer blocks of an external buffer memory to a memory space, the cache memory can read the updated data in the buffer blocks of the buffer memory to solve the invalidation problem caused by failure in detecting the external updated data.

SUMMARY OF THE INVENTION

According to prior art, a local processor in high-speed transmission network may read old data when accessing packet headers of a header buffer since it cannot detect whether the data in the cache is updated. In that case, the speed of processing packets may slow down if a non-cache approach is not applied to the process. To solve this problem, the present invention provides a structure of cache memory for capable of updating the data inside the local processor by using the feature of cache control. The header buffer storing packet headers is compulsively mapped to the memory space at several different address sectors. Consequently, whenever the local processor attempts to access the packet header, it will detect cache missing and alternately forces the external buffer to request new data. This not only boosts the performance of updating data but also accelerates packet access.

Advantages and features of the structure and method of cache memory data update in the present invention will be elaborated in detailed description and drawings below.

DESCRIPTION OF REFERENCE NUMERALS

Figure 1:
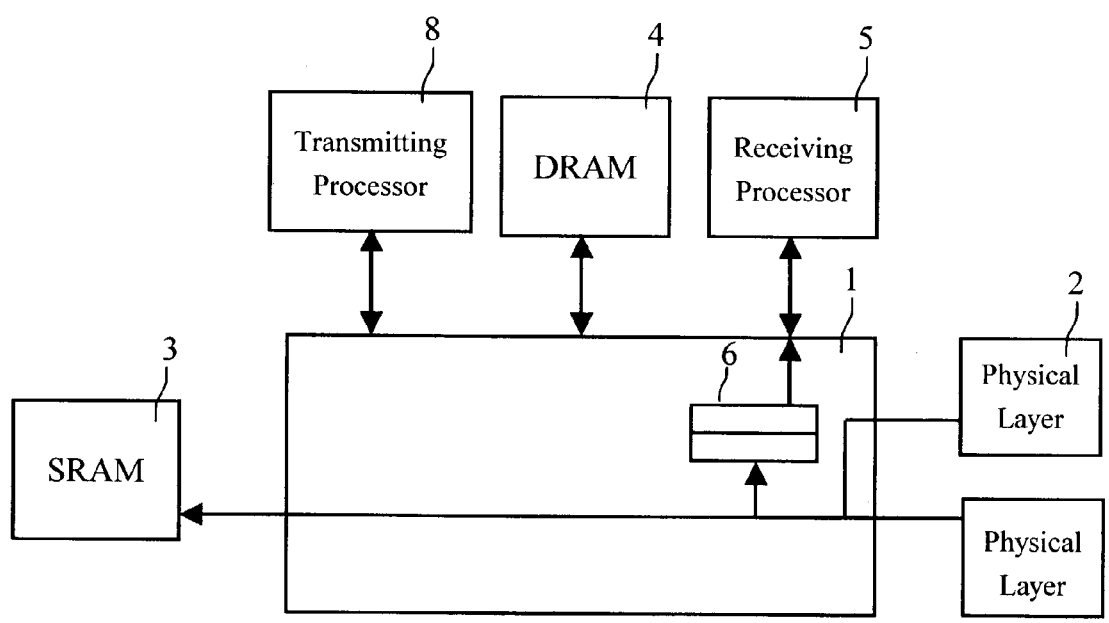
FIG. 1 shows a block diagram illustrating the structure of receiving packets in Infiniband.

1 - - - Host channel adapter; HCA
2 - - - Physical layer
3 - - - SRAM
4 - - - DRAM
5 - - - Receiving processor
6 - - - Header buffer
7 - - - Memory space
8 - - - Transmitting processor
51 - - - Cache memory
61 - - - Buffer block

DETAILED DESCRIPTION OF THE INVENTION

Although a preferred embodiment is given in detailed description with appropriate figures, it will be apparent to those skilled in the art that the implementation may be altered in many ways to achieve the effects of this invention without departing from the scope of the invention. Thus, it should also be understood that the following description serves as general disclosure to people familiar with technique in the field of the invention. The present invention is not limited to the content of the description.

The present invention provides a method of updating cache memory data. The method is applied to the cache system in a embedded processor. The processor comprises a cache memory which is mapped to an external memory. The method comprises: dividing an external memory into several buffer blocks; addressing different address sectors of a memory space to the same buffer block in the external memory so that the buffer blocks are mapped to the addressed memory space at several different address sectors; and addressing said different address sectors and then occurring cache missing in the cache system. In other words, the processor reads the address sectors where cache missing is expected to occur so as to force the cache system to load the updated data from the buffer blocks.

Figure 2:
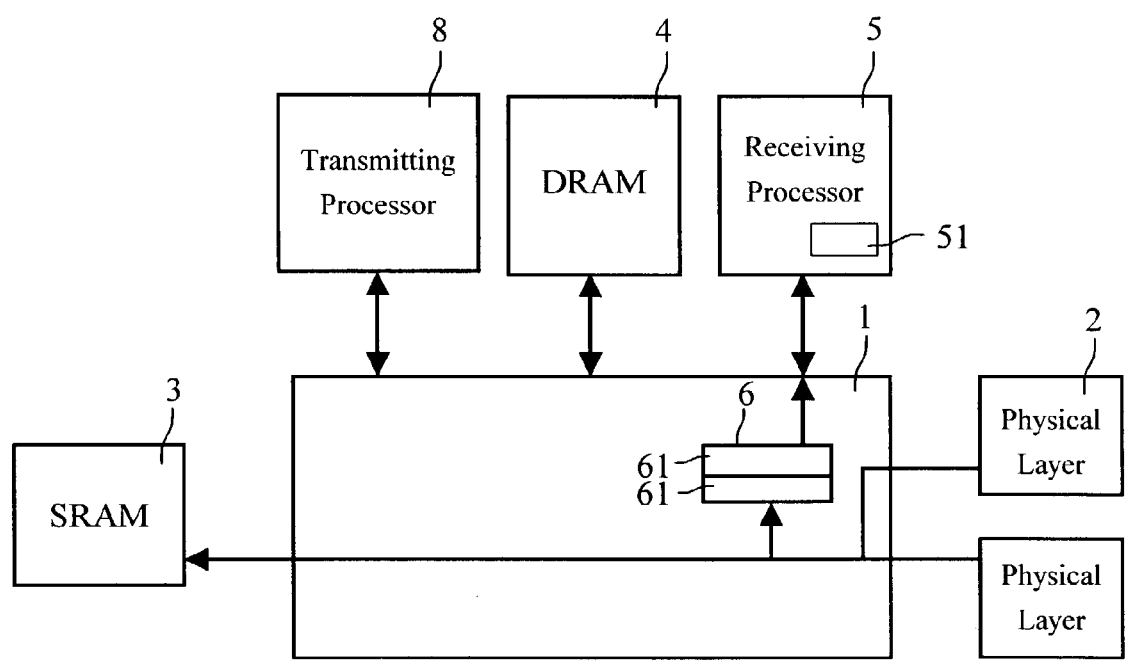
FIG. 2 is a block diagram illustrating how the cache memory updates the data of the received packets in the present invention.

In an embodiment of the present invention, as shown in FIG. 2, the packets are received in the aforementioned Infiniband and a receiving processor 5 loads the packet headers from a header buffer 6 of a HCA 1. The method of updating cache memory data in the present invention comprises: dividing the header buffer 6 into several buffer blocks 61 for storing the received packet header; addressing the different address sectors of a memory space to the same buffer block 61 of the header buffer 6, in brief, the cache memory 51 of the receiving processor 5 is mapped to several different address sectors of the memory space which are addressed to the same buffer block 61 of the header buffer 6; and reading packet headers in the buffer block 61, then cache missing occurs in the cache system due to individually addressing of the same buffer block 61 with different address sectors. Thus, the cache system loads updated packet headers from the buffer block 61.

Figure 3:
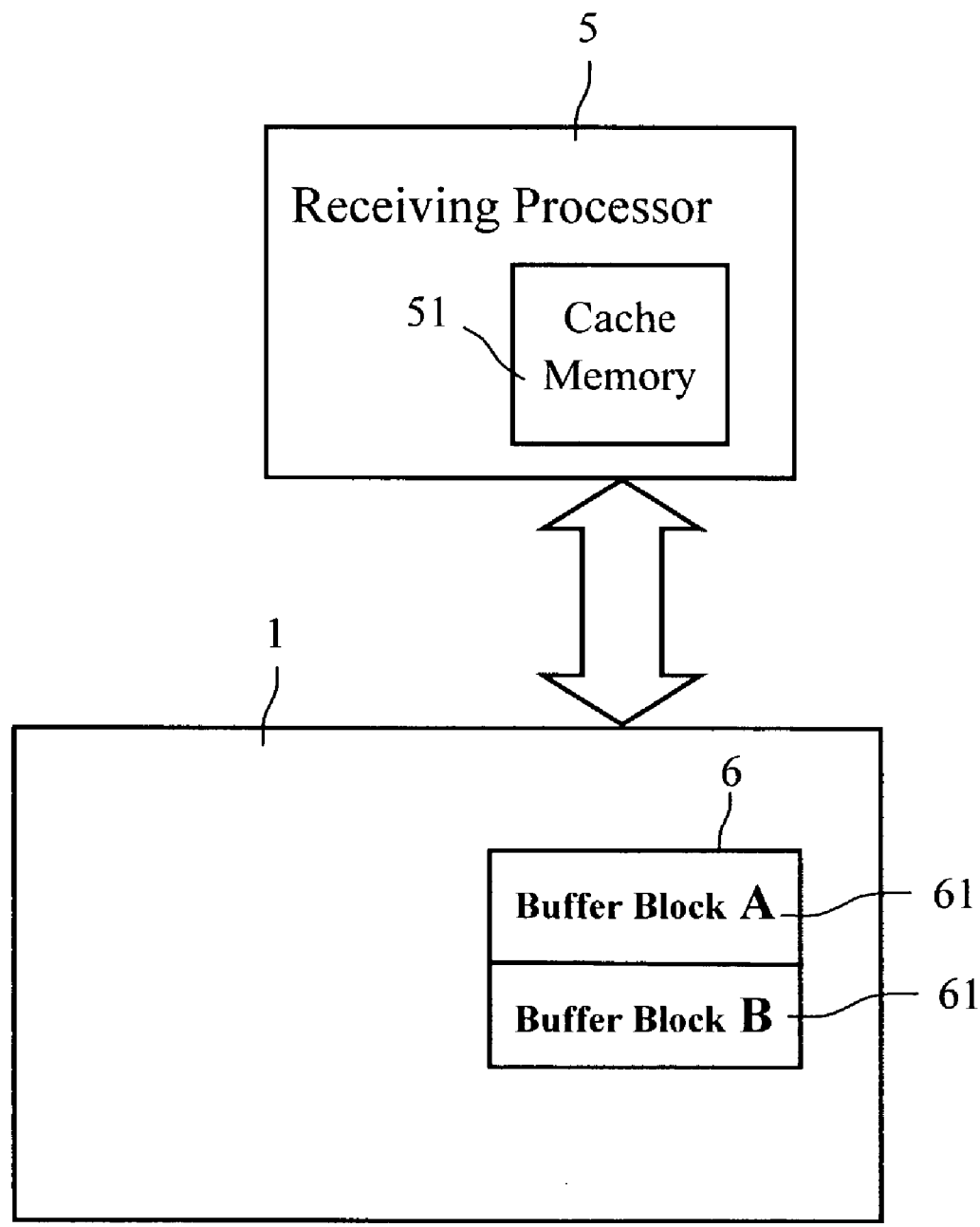
FIG. 3 is a schematic diagram illustrating how the cache memory updates data in the present invention.

As shown in FIG. 3, the header buffer 6 in this embodiment is divided into buffer blocks A, B to temporarily store the received packet headers. When accessing packet headers, the receiving processor 5 reads data from the internal cache memory 51 first and a data loading mechanism maps one buffer block 61 of header buffer 6 to several different address sectors in memory space. All the address sectors in the memory space are in the addressing range of the receiving processor 5. Consequently, whenever the receiving processor 5 tries to access packet headers of the buffer block 61, the cache system will detect cache missing due to the receiving processor 5 addresses the different address sectors of buffer block 61 which are not in the range mapped to the cache memory 51. Thus, the receiving processor 5 is forced to alternatively request new data from the buffer blocks A and B of the header buffer 6 in the HCL 1 so that the data of the cache memory 51 on the receive processor 5 can be updated.

The buffer block 61 of the header buffer 6 is repetitiously mapped to a memory space 7 at the different address sectors. When the receiving processor 5 addresses said different address sectors, cache missing will occur. The cache memory 51 can obtain updated packet headers by loading the same buffer block 61 in the header buffer 6 through the addressing of said different address sectors. In other words, through addressing the different address sectors of the memory space 7 to the same buffer block 61 of the head buffer memory 6 so that the cache memory 51 obtains updated packet headers.

Figure 4:
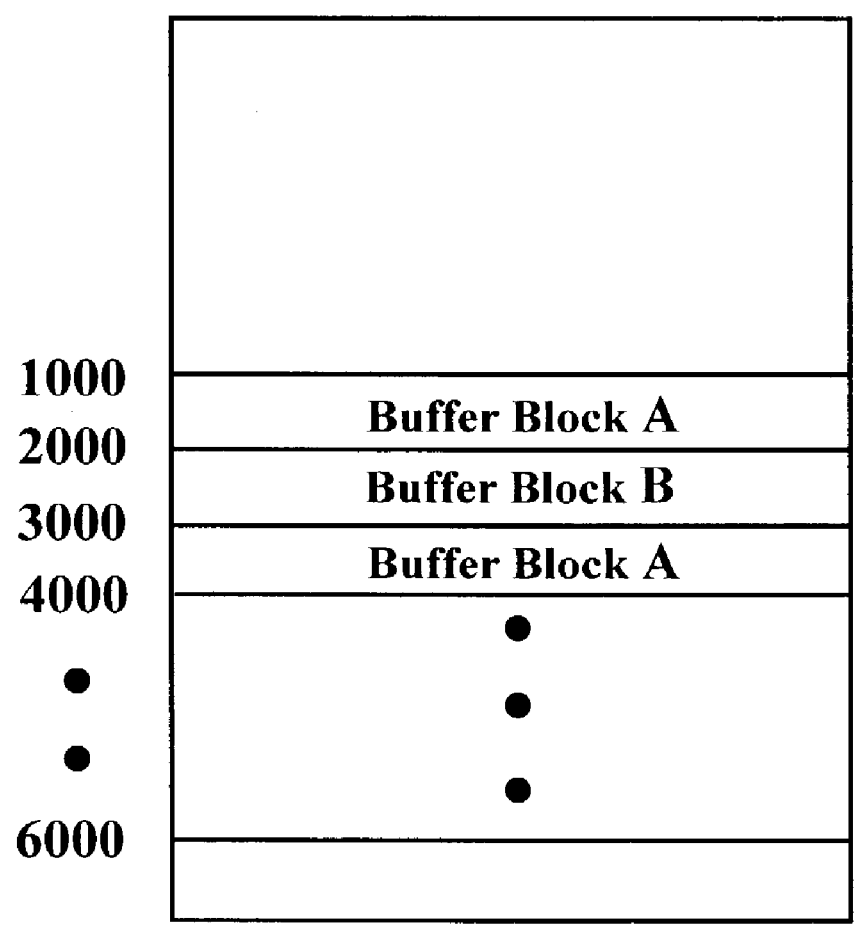
FIG. 4 is a schematic diagram illustrating address sectors of memory space to which data of a buffer block of an external memory is mapped in the present invention.

Please see FIG. 4 with FIG. 3. FIG. 4 is a schematic diagram illustrating a mapped memory space in an embodiment of the cache memory update structure in the present invention. Assuming the addressing range from address 1000 to 6000 at the memory space 7 are addressed by the receiving processor 5, then a buffer block 61 of the header buffer 6 is compulsively mapped to the memory space 7 at different address sectors. For example, a buffer block A is compulsively simultaneously mapped to the memory space 7 at addresses 1000–2000 and 3000–4000. When a packet is transmitted from the physical layer 2 to the host memory via the HCA 1, the whole packet will be transmitted and stored temporarily in SRAM 3. At the same time the pocket header is copied to and temporarily stored in the buffer block A of header buffer memory 6. Thus, the receiving processor 5 can read the packet header stored in the buffer block A at addresses 1000 or 3000.

While the receiving processor 5 reading data in the cache memory at the mapped address sector 1000–2000, the packet header in the buffer block A is loaded into the cache memory 5. When a following new incoming packet header updates the data in the buffer block A and is still not loaded in the internal cache memory 51 or is not in the cache memory 51, the receiving processor 5 will read the data at the address sector 3000–4000 so that cache missing will take place in the cache system. Through this method, the receiving processor 5 is forced to request said new data from the buffer block A of the header buffer 6 in the HCA 1 and update the data in the cache memory 51.

Thus, the data of the buffer blocks A and B is alternatively mapped to the memory space at different address sectors between 1000 and 6000. The receiving processor 5 sequentially reads the data at the address sectors between 1000 and 6000, so that the data in the cache memory 51 is updated to achieve fast packet processing.

The structure and method of cache memory data update in the present invention have numerous advantages and features. The present invention uses the features of cache control through which cache missing will occur at certain addresses while local processor accessing. Thus, through a method that a buffer block of a head buffer is mapped to a memory space at several different addresses, cache missing will occur while the local processor processing packet headers in the block because the local processor addresses the different address sector. Therefore, the cache memory is capable of loading data from the same external memory block to obtain the updated pocket headers.

Although the present invention has been described in considerable detail with reference to certain preferred embodiments thereof, those skilled in the art can easily understand that all kinds of alterations and changes can be made within the spirit and scope of the appended claims. Therefore, the spirit and scope of the appended claims should not be limited to the description of the preferred embodiments contained herein.

The invention claimed is:

1. A structure of cache memory data update applied to a cache system of a local processor to access data received from a host channel adapter (HCA), which allows a host processor to link to Infiniband, comprising:
   a buffer memory to store received data temporarily and to be divided into several buffer blocks;
   a cache memory embedded in the local processor and addressed to the buffer blocks by mapping a memory space; and
   a data loading mechanism that maps each said buffer block to the memory space at several address sectors, whereby the local processor is addressing the address sectors with respect to said buffer block, then cache missing is forced to occur such that data of said buffer block is compulsively loaded in order to compulsively update data in the cache memory.

2. The structure of claim 1, wherein the data received by said buffer memory is a packet header.

3. The structure of claim 1, wherein said buffer blocks on said buffer memory is mapped to said memory space in turn.

4. The structure of claim 3, wherein said local processor addresses the address sectors in said memory space in order to cause cache missing on the cache memory to compulsively load updated data from the buffer blocks.

5. A structure of cache memory data updating applied to a cache system of a processor, comprising:
   an external memory to store received data temporarily and to be divided into several buffer blocks;
   a cache memory embedded in said local processor and mapped to said buffer blocks by addressing of a memory space; and
   a data loading mechanism that maps each said buffer block to said memory space in turn, wherein said processor addresses the addresses of said memory space in order to cause cache missing on the cache memory to compulsively load updated data from said buffer blocks.

6. The structure of claim 5, wherein the data in said buffer blocks of said external memory is compulsively mapped to said memory space at several different address sectors.

7. The structure of claim 6 wherein said processor reads addresses with respect to said buffer blocks so as to cause cache missing to compulsively load updated data from said buffer blocks.

8. A method of cache memory data updating applied to a cache system of a processor, comprising the steps of:
   dividing an external memory of said processor into several buffer blocks to store temporarily data received by the processor;
   addressing different addresses in a memory space to the same buffer block in said external memory; and
   when the processor is addressing said different addresses, cache missing in the cache system is forced to occur so as to compulsively load into the same buffer block in said external memory according to the addressing of said addresses, thereby obtaining updated data of said buffer blocks in said cache system.

9. A method of cache memory data updating applied to the cache system of a processor, comprising the steps of:
   dividing an external memory into several buffer blocks to save temporarily data received by the processor;
   mapping said buffer blocks to certain memory space in turn; and
   when the processor is reading the memory space, cache missing in the cache system is forced to occur so as to compulsively load the data in said buffer blocks in turn, thereby obtaining updated data of the buffer blocks.

10. A method of cache memory data updating applied to cache memory of a processor, comprising the steps of:
    dividing an external memory into several buffer blocks to save temporarily data received by the processor;
    mapping said buffer blocks in turn to a memory space with an address range and said cache memory capable of addressing the address range; and
    when the processor addressing said address range, cache missing is forced to occur so that data in said buffer blocks is compulsively alternatively loaded to obtain updated data of the buffer blocks.

* * * * *